2,751,168
BOUNDARY LAYER INDUCTION SYSTEM FOR AIRCRAFT POWER PLANT

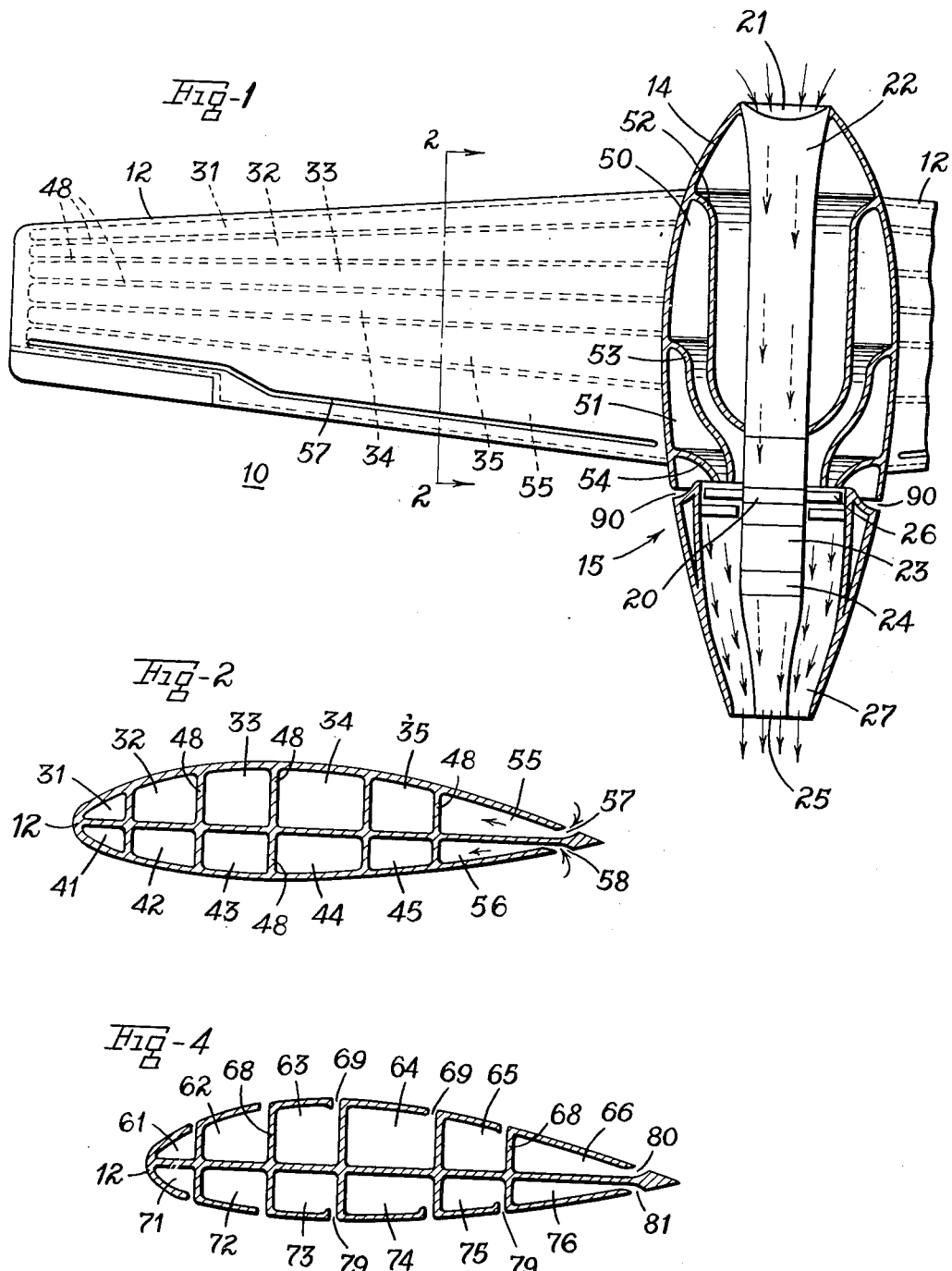
June 19, 1956
E. A. STALKER
2,751,168
BOUNDARY LAYER INDUCTION SYSTEM FOR AIRCRAFT POWER PLANT
Filed May 5, 1949
2 Sheets-Sheet 1
INVENTOR
Edward A. Stalker
BY
Marechal Biebel
ATTORNEYS June 19, 1956
E. A. STALKER
2,751,168
BOUNDARY LAYER INDUCTION SYSTEM FOR AIRCRAFT POWER PLANT
Filed May 5, 1949
2 Sheets-Sheet 2
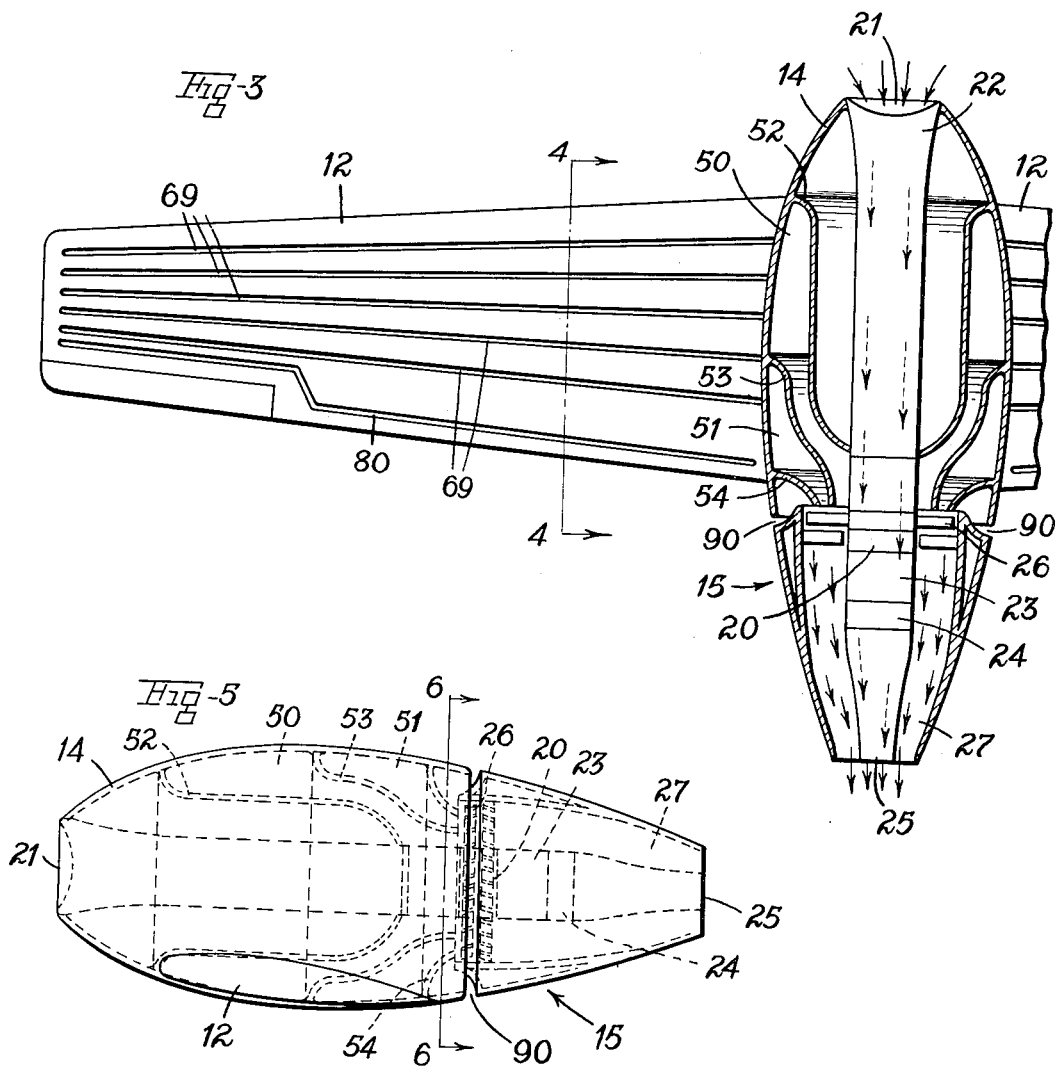
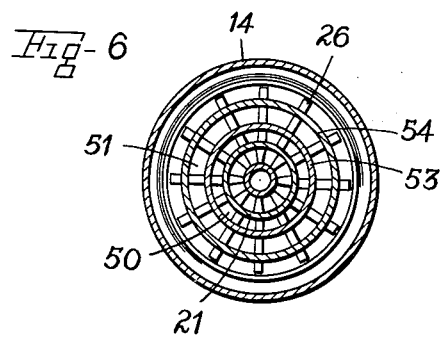
INVENTOR
Edward A. Stalker
BY Marechal & Biebel
ATTORNEYS United States Patent Office
2,751,168
Patented June 19, 1956

Edward A. Stalker, Bay City, Mich.

Application May 5, 1949, Serial No. 91,463

6 Claims. (Cl. 244—15)

This invention relates to the propulsion of aircraft wings and other aerodynamic bodies such as fuselages by the use of boundary layer air inducted into the aircraft to stabilize the boundary layer and provide low energy air for the jet engine.

The aircraft of this invention is provided with a highly efficient propulsive system which combines drag reduction means with means of augmentation of jet propulsion efficiency. This is accomplished by supplying boundary layer air from the surface of the aircraft to the jet engine in a novel manner.

The drag of the wing, for instance, can be reduced to a very low value if the boundary layer is maintained in a laminar state. This can be accomplished by inducting the inner portions only of the layer to prevent it from becoming unstable and changing to the turbulent state. The induction can be accomplished by suction acting through a porous surface or a set of suitably disposed surface openings.

The efficiency of the jet propulsive engine can be substantially increased by supplying it with air of low energy content such as that of the boundary layer. For greatest gain in efficiency the greatest possible amount of low energy air should be supplied to the engine. This is contrary to the requirement for drag reduction since for this purpose only the inner portion of the layer should be inducted. The present invention provides a cooperative arrangement by means of which the drag is reduced to a minimum while the propulsive efficiency is increased to the maximum available as a result of using a large proportion or all of the boundary layer.

When the wing is given a porous or perforate surface and the suction is proportioned to induct only the inner portions of the boundary layer a large proportion of the boundary layer will escape across the trailing edge and be unavailable for use in the jet engine. This loss may be avoided by placing a slot as close as possible to the trailing edge and making it wide enough to induct all the boundary layer desired. Since there is no surface aft of the trailing edge, there is no need for a boundary layer of limited thickness. In fact in the absence of the surface the boundary layer has no meaning.

Where the inner portion of the boundary layer is removed continuously through a porous or perforate surface such surface should be smooth and hence the porosity or perforations should be very fine. Such surface may extend over the whole surface, both upper and lower, of the wing or other body. The small holes making up the porosity may have widths or diameters of the order of micrones so that to ordinary touch or vision the surface appears smooth and continuous. With this type of openings an inward flow through the surface into the wing interior may be considered as uniformly or continuously distributed.

One method of producing surfaces having such distributed small openings is by powder metallurgy such as is well known and used to produce bearing materials for impregnation by oil. Other granular materials such as plastic grains may also be pressed together to form porous walls, the porosity being determined by the size of the grains. The grains are pressed together with just sufficient heat to provide adherence, or they are pressed while still in a sticky state induced by a solvent.

The porous surface may be replaced by a surface having fine holes mechanically produced or by induction slots transverse to the relative flow direction. The latter would be spaced closely enough together to provide a pressure gradient between slots which is favorable or at least not unfavorable for a substantial chordwise length of surface. Such construction is disclosed in copending case Serial No. 492,290, filed June 25, 1943, now Patent No. 2,488,991.

Since the external pressure varies along the chord of the wing or length of the body it is desirable to divide the wing into separate compartments or ducts to which different suctions are applied to induct just enough of the inner portion of the boundary layer to stabilize it and produce a laminar flow therein.

At the trailing edge very little suction is required but the volume to be inducted is large. Hence the portion of the interior serving this slot should be separate or controlled relative to the other compartments or ducts within the wing or body. Several methods are available for controlling the flow relatively and some of these will now be described.

One method is to restrict the exit of the duct at its junction with the inlet of the jet engine. Another method is to run each duct into a plenum chamber with different exit areas thereinto. The inlet may be the inlet to the compressor proper or the ducted fan or both.

It is accordingly a principal object of the invention to provide such an aircraft in which the inner portion only of the boundary layer air on an expanse of the wing surface forwardly of the trailing edge is inducted, thereby promoting a laminar flow and reducing drag, and at the same time providing for inducting additional boundary layer air, and hence air of less total energy relative to the aircraft, as required for the power means, to form a propulsive jet for the aircraft.

Other objects and advantages will be apparent from the description, the accompanying drawings, and the appended claims.

In the drawings—

Fig. 1 is a fragmentary top plan view of an aircraft the engine being shown in horizontal section;

Fig. 2 is a vertical section of the wing along line 2—2 of Fig. 1;

Fig. 3 is a fragmentary top plan view of an alternate form of the aircraft;

Fig. 4 is a section along the line 4—4 of Fig. 3;

Fig. 5 is a side elevation of the machine of Fig. 3; and

Fig. 6 is a section along line 6—6 of Fig. 5.

Referring now to the drawings the aircraft is indicated generally by 10 comprising the wings 12, the nacelle 14 and the jet engine 15. The jet engine has the main compressor 20 which inducts its air through the nose opening 21 and duct 22 supplying compressed air to the combustion chamber 23. The gas from the chamber passes through the turbine 24 and issues from the nozzle 25. The turbine 24 drives the ducted fan 26 which inducts boundary layer air from the exposed surfaces of the aircraft and discharges this air through the annular nozzle 27.

The air supplied to the ducted fan enters through the exposed surfaces (preferably both upper and lower wing surfaces) which are so constructed as to provide for the induction of only the inner portion of the boundary layer air. For this purpose the wing surface 12 as shown in Figs. 1 and 2 may be made of perforate or porous material, the interior of the wing being divided into a plurality of separate compartments 31 to 35 on the upper wing surface and 41 to 45 on the lower wing surface. These compartments are separated by spanwise extending walls indicated at 48, such walls opening into compartments or chambers 50 and 51 defined by annular walls 52, 53 and 54 within the nacelle or engine housing 14. Each of these chambers leads rearwardly to the fan 26 which makes it possible by suitable selection as to size and flow resistance of the passages to develop separate control pressures in each of the control compartments to be effective upon different portions of the wing chord in order to induct the proper portion of the boundary layer in each area.

At the rear of the wing there is a rear compartment 55 on the upper wing surface and a corresponding compartment 56 on the lower wing surface, each communicating with the suction chamber 51, and forming a pair of relatively wide open slots 57 and 58 respectively through which the additional flow is inducted. It will be noticed that slots 57 and 58 are close to the trailing edge and that only a very limited surface remains rearwardly thereof. It is thus practicable to use relatively wide slots 57 and 58 and to apply a proper degree of suction thereto in order to induct adequate air therethrough for combustion purposes, such air consisting of a greater part of the boundary layer. Where for example the system may induct up to about 25% of the boundary layer air on the forward surface, this amount may be increased up to the entire amount at the trailing edge slots, affording a substantially greater rate of induction per unit of surface area than for the surface forwardly thereof.

This provides the most advantageous condition for drag reduction over the main body of the wing surface since it stabilizes the boundary layer and establishes laminar flow. The remainder of the air needed for operation of the turbine is inducted through the relatively wide slots 57 and 58 which may induct the full thickness of the boundary layer since there is no significant surface rearwardly thereof and as a result the drag condition is not adversely affected thereby. As a result, air of minimum total energy relative to the aircraft is inducted, providing the most efficient power operation for this purpose, while at the same time avoiding objectionable increase in the drag on the main wing surface which would otherwise occur if the full boundary layer were inducted thereover.

The porous surface may extend over more or less of the expanse of the wing surface from a region ahead of the maximum thickness substantially to the trailing edge, as desired or determined by structural considerations. Additional boundary layer air may also be inducted if desired through slots 90 in the rearward portions of the walls of the nacelle 14. The nacelle 14 also has a porous or perforated surface through which the inner portion of the boundary layer thereon can be inducted into the nacelle compartments 50 and 51 which as shown in the figures extend circumferentially about the nacelle. This construction provides for stabilizing the boundary layer on the forepart of this body.

Figs. 3 and 4 show a modified form of the invention in which the surface of the wing 12 is divided into a series of compartments 61 to 66 on its upper surface and similar compartments 71 to 76 on its lower surface by means of the series of spanwise extending partitions 68. The wing is arranged for distributed induction of the desired portion of the boundary layer thereon and for this purpose the wing surfaces are formed with a series of slots 69 on the upper surface and a similar series of slots 79 on the lower surface, each of which communicates with the respective chambers as shown. Similar partition walls 52, 53 and 54 define suction chambers 50 and 51 respectively in the nacelle, and conection is made therefrom to the several compartments in the wing to provide for inducting the air through such slots 69 and 79. The wing also has relatively large rearward slots 80 and 81 at or adjacent the trailing edge. The suction effective in each of the several compartments is regulated and predetermined such that a desired portion comprising only the innermost part of the boundary layer is inducted through each of the series of surface slots ahead of the rearmost slots, such rearmost slots providing for inducting the full boundary layer, in a manner similar to that described above.

The invention thus provides a highly advantageous aircraft construction incorporating exposed surfaces adapted for high speed and low drag, and in addition developing an adequate supply of air at low total energy relative to the aircraft for use for combustion purposes. Thus the several conditions which normally would involve opposing characteristics are so correlated that the combined system is provided which is simple, economical, and highly efficient.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. In an aircraft having a wing surface of substantial chordwise extent terminating in a trailing edge, the combination of means forming intake openings each of limited width in the chordwise direction and distributed over said wing surface providing for inward flow of air therethrough over a surface expanse extending forwardly from the trailing edge, induction means in communication with said wing interior for inducting only a limited inner portion comprising about 25% of the boundary layer air on said wing surface through each said intake opening producing laminar flow and developing low drag thereover, power means for operating said aircraft, means adjacent said trailing edge forming an intake opening through the wing surface of substantially greater width in the chordwise direction than that of said first-named openings respectively providing for the inflow of substantially the entire extent of boundary layer air into said induction means, and means for supplying said combined inducted flows of boundary layer air to said power means as a source of air of low total energy relative to the aircraft.

2. In an aircraft having a wing surface of substantial chordwise extent, the combination of means forming intake openings each of small chordwise extent and distributed over said wing surface providing for inward flow of air therethrough over a surface expanse extending forwardly from the trailing edge, induction means in communication with said wing interior for inducting only a limited inner portion of the boundary layer air on said wing surface through each said intake opening developing low drag thereover, power means for operating said aircraft, means adjacent the trailing edge of said wing forming an intake opening through the wing surface having a substantially greater extent in the chordwise direction than that of said first-named openings respectively providing for the inflow of a substantially greater thickness and quantity of boundary layer air into said induction means, means for supplying said combined inducted flows of boundary layer air to said power means as a source of air of low total energy relative to the aircraft, and means for discharging said flows rearwardly as a propulsive jet.

3. In combination in an aircraft, an external surface extending a substantial distance along the direction of flight, means forming a series of perforations each of narrow chordwise extent and distributed over a substantial expanse of said surface providing for inward flow of air therethrough, induction means for inducting only a limited inner portion of the boundary layer on said surface through said perforations to stabilize said boundary layer and reduce the drag, surface intake means aft of said perforations and defining an opening through the wing surface of substantially greater chordwise extent than said individual perforations for inducting the boundary layer in materially greater volume per unit of surface area than for said surface forwardly thereof, a jet engine having an air inlet for the induction of air to be discharged as a propulsive jet, and duct means communicating between said inlet and said induction means to induct said boundary layer air at said different rates to reduce the surface drag and increase the propulsive efficiency of said jet engine.

4. An aircraft as defined in claim 1 in which said means distributed over said wing surface comprises a porous surface through which said portion of said boundary layer air is inducted.

5. An aircraft as defined in claim 1 in which said means distributed over said wing surface comprises a plurality of slots in correlated relation and extending over said surface through which said portion of said boundary layer air is inducted.

6. In an aircraft having a wing surface of substantial extent, the combination of means forming a porous surface in which each individual opening is of narrow extent in the direction of the airflow thereover with said openings being distributed over said wing surface providing for inward flow of air therethrough over a surface expanse extending forwardly from the trailing edge, slot means adjacent said trailing edge forming an opening through the wing surface having a substantially greater extent in the direction of airflow thereover than that of the individual openings on said porous surface, induction means in communication with said wing interior, means controlling the application of said induction means providing for inducting only a limited inner portion of the boundary layer air on said wing surface expanse forwardly of said trailing edge and for inducting a substantially greater thickness of the boundary layer air through said slot means.

References Cited in the file of this patent

UNITED STATES PATENTS

| | | |
|---|---|---|
| 2,383,385 | Heintze | Aug. 21, 1945 |
| 2,431,592 | Stalker | Nov. 25, 1947 |

FOREIGN PATENTS

| | | |
|---|---|---|
| 479,598 | Great Britain | Feb. 7, 1938 |
| 512,064 | Great Britain | Aug. 29, 1939 |